Figure 1:
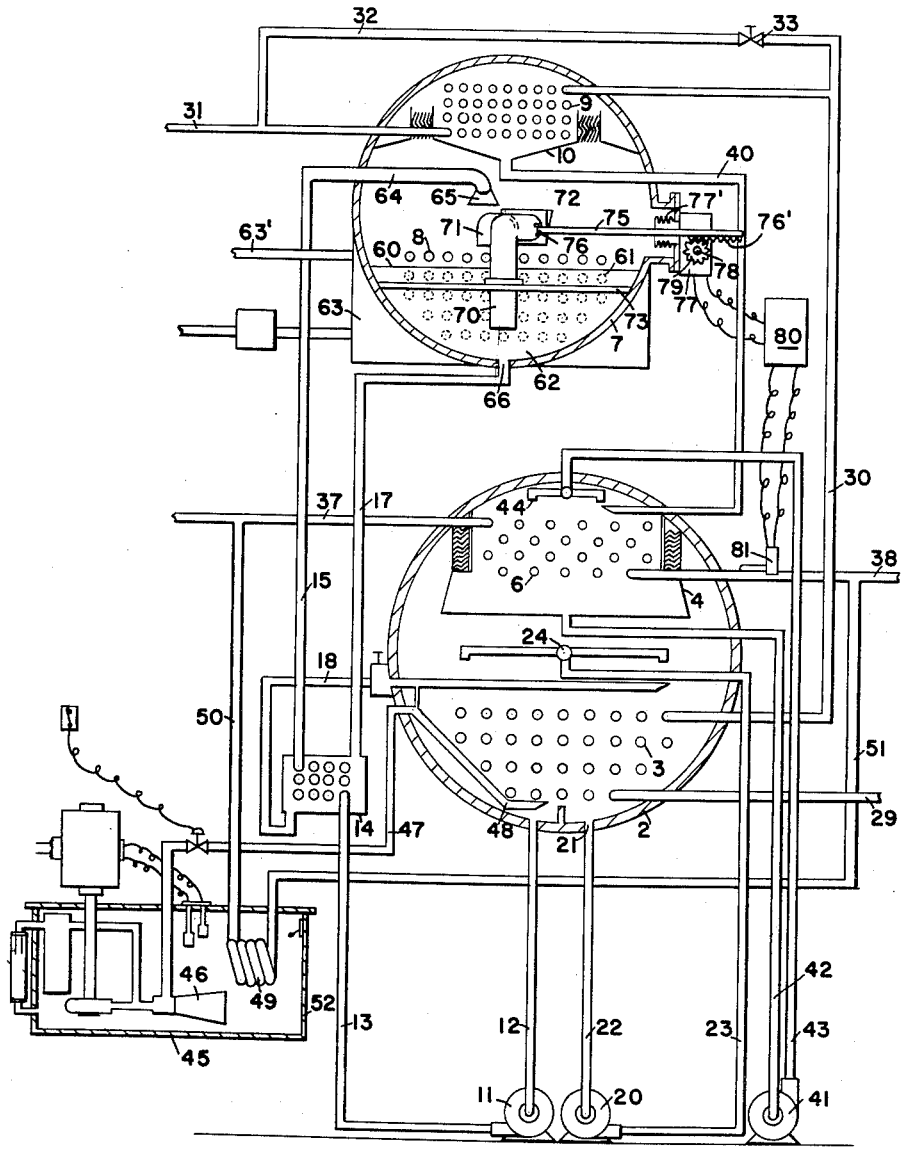

Feb. 6, 1962  J. A. PAPAPANU  3,019,616
ABSORPTION REFRIGERATION SYSTEMS AND METHOD
OF OPERATING THE SAME
Filed Jan. 13, 1960  2 Sheets-Sheet 1

*INVENTOR.*
JAMES A. PAPAPANU
BY *Herman Seid*
*ATTORNEY.*

Feb. 6, 1962  J. A. PAPAPANU  3,019,616
ABSORPTION REFRIGERATION SYSTEMS AND METHOD OF OPERATING THE SAME
Filed Jan. 13, 1960  2 Sheets-Sheet 2

INVENTOR.
JAMES A. PAPAPANU
BY Herman Seid
ATTORNEY.

United States Patent Office 3,019,616
Patented Feb. 6, 1962

3,019,616
ABSORPTION REFRIGERATION SYSTEMS AND METHOD OF OPERATING THE SAME
James A. Papapanu, Syracuse, N.Y., assignor to Carrier Corporation, Syracuse, N.Y., a corporation of Delaware
Filed Jan. 13, 1960, Ser. No. 2,209
4 Claims. (Cl. 62—141)

This invention relates to absorption refrigeration systems and to a control arrangement therefor and, more particularly, to an absorption refrigeration system employing a saline solution as an absorbent, and a medium miscible therewith as a refrigerant, and to a method of operating the same.

In the copending application of Louis H. Leonard, Jr., Serial No. 2,203, filed January 13, 1960, entitled Absorption Refrigeration Systems and Method of Operating the Same, there is disclosed an absorption refrigeration system including a control arrangement adapted upon partial load imposed on the system to precipitate salt from solution in the generator thereby decreasing the capacity of the system, the control arrangement, upon an increase in load imposed upon the system, permitting solution in the generator to absorb the precipitated salt thereby increasing the capacity of the system. The present invention is concerned with a modified control arrangement for an absorption refrigeration system of the type disclosed in such application.

The chief object of the present invention is to provide an absorption refrigeration system and an improved control arrangement therefor.

An object of the invention is to provide a control arrangement for an absorption refrigeration system which includes means for automatically selecting the places of discharge of weak solution in the generator to regulate the quantity of weak solution passing in heat exchange relation with heating medium in the generator.

A further object is to provide a method of operation of an absorption refrigeration system which permits accurate control of the system throughout its operating range. Other objects of the invention will be readily perceived by reference to the following description.

The term "weak solution" is used herein to describe a solution weak in absorbing power. The term "strong solution" is used herein to define a solution strong in absorbing power.

The preferred absorbing solution is a solution of lithium bromide in water. The preferred refrigerant is water. Concentration of solution leaving the generator may vary but, preferably, is about 66% during full load operation of the system.

This invention relates to an absorption refrigeration system including a generator having a weir member therein separating the generator into a first compartment and a second compartment, a tube bundle placed in the first compartment, and an outlet for strong solution placed in the second compartment, means for discharging weak solution in the generator in heat exchange relation with heating medium passing through the tube bundle therein, and a control arrangement for varying the quantity of weak solution discharged in the generator in heat exchange relation with the heating medium, said arrangement including a first tube member extending from the second compartment through the first compartment adjacent the discharge means adapted to receive solution from the discharge means, a second tube member extending from a portion of the first compartment adjacent the second compartment to a point adjacent the discharge means adapted to receive solution from the discharge means, and means for varying the relationship between said discharge means and said tube members to select the places of discharge of said solution in the generator thereby varying the quantity of solution discharged in the generator in heat exchange relation with heating medium therein.

This invention further relates to a method of operation of an absorption refrigeration system including tube members in the generator to receive weak solution discharged therein in which the steps consist in discharging at full load a predetermined amount of weak solution in the generator in heat exchange relation with heating medium therein, and, upon a variation in load imposed upon the system, varying the position of the tube members in the generator to receive a portion of the weak solution discharged therein thereby varying the quantity of weak solution passing in heat exchange relation with heating medium in the generator.

Figure 2:
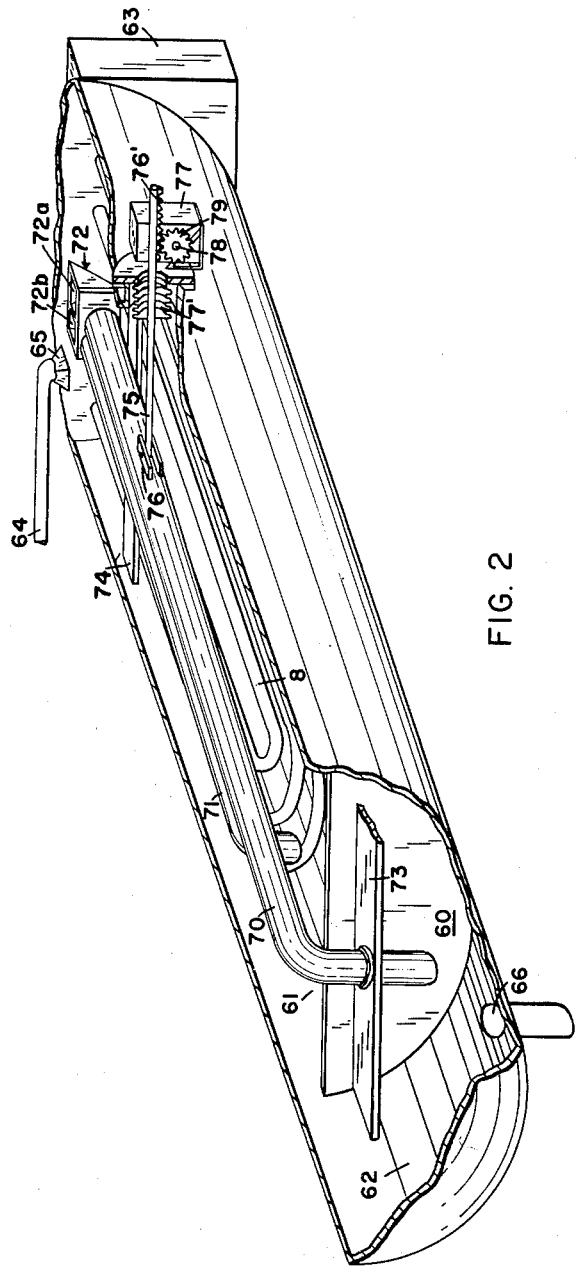

The attached drawings illustrate a preferred embodiment of the invention, in which:

FIGURE 1 is a diagrammatic view illustrating the absorption refrigeration system and control arrangement of the present invention; and FIGURE 2 is a perspective view of the generator of the absorption refrigeration system partially broken away to illustrate the control arrangement.

Referring to the attached drawings, there is illustrated diagrammatically in FIGURE 1 the absorption refrigeration system and control arrangement of the present invention. The system comprises a shell 2 containing a plurality of tubes 3 which cooperate with the shell to form an absorber. Placed in shell 2 above the absorber is a pan-like member 4 which cooperates with shell 2 to form an evaporator. The evaporator includes a plurality of tubes 6 extending longitudinally of the shell above pan 4; medium to be cooled passes through these tubes in heat exchange relation with liquid refrigerant sprayed thereover.

A second shell 7, preferably, is placed above the first shell. A plurality of U-shaped tubes 8 extend in the lower portion of shell 7 and cooperate with shell 7 to form a generator. A weir member 60 extends across the lower portion of shell 7 and separates the generator into a tube compartment 61 and an outlet compartment 62. The weir 60 extends upwardly to a height approximately equal to the second row of tubes 8 therein, counting downward. A compartmented steam chest 63 is provided at one end of the generator and provides steam or other heating medium to the interior of tubes 8, the condensate leaving the tubes through an outlet in chest 63.

A plurality of tubes 9 are placed in the upper portion of shell 7 to form a condenser. The tubes 9 cooperate with a pan-like member 10 to form the condenser.

Pump 11 withdraws weak solution from absorber 3 through line 12. Pump 11 forwards weak solution through line 13 to heat exchanger 14 in which the weak solution is placed in heat exchange relation with strong solution returning from the generator. The weak solution is then forwarded from the heat exchanger 14 through line 15 to generator 8 being introduced at one end of the generator and being discharged therein through pipe member 64 having an open end 65. Solution in the generator discharged at one end thereof flows through compartment 61 in heat exchange relation with heating medium in the tubes 8, overflows weir 60 into compartment 62 and leaves the generator through outlet 66. Strong solution flows from outlet 66 of generator 8 through line 17, heat exchanger 14 and line 18 to the absorber, preferably, being discharged therein adjacent one end of shell 2; that is, strong solution flows through forces of gravity from the generator to the absorber. It will be understood, of course, if desired, the strong solution may be discharged in the absorber over the tubes therein.

Pump 20 serves as an absorber pump and is employed to withdraw solution of intermediate concentration from absorber 3 through outlet 21 and line 22. Pump 20 forwards the solution of intermediate concentration through line 23 to the spray arrangement 24 of the absorber. Spray arrangement 24 serves to distribute the recirculated solution over the tubes throughout the length of absorber 3. It will be understood the strong solution mixes to some extent with solution in the absorber and that complete mixing occurs as the pump 20 forwards the mixed solution so that a solution having a concentration intermediate the concentration of the strong and weak solutions is circulated. Reference is made to United States Patent No. 2,840,997, granted July 1, 1958, for a more detailed description of the flow of solution in the system.

Condensing water is forwarded by a pump (not shown) through line 29 to the tubes 3 of the absorber. The condensing water passes from the tubes 3 of the absorber through line 30 to the tubes 9 of the condenser. Condensing water leaves the tubes 9 of the condenser through line 31. A bypass line 32 is provided about the tubes 9 of the condenser extending from line 30 to line 31. A manual valve 33 is placed in bypass line 32. This bypass permits flow of condensing water through the tubes of the condenser to be adjusted at full load when a system is installed. Thereafter, no adjustment of the flow of condensing water through the tubes of the condenser is required.

Steam is supplied to the tubes 8 of the generator through steam chest 63. If desired, a suitable pressure regulating valve (not shown) may be placed in a line 63' leading to chest 63 to assure desired steam pressure in the generator. Ordinarily, however, the system of the present invention employs steam at twelve pounds pressure and steam at such pressure is ordinarily supplied from the usual boilers employed in the industry. Steam condensate leaves the tubes 8 of generator through a section of chest 63.

Medium to be cooled is forwarded by a pump (not shown) through a line 37 to the tubes 6 of the evaporator. The cooled medium leaves the tubes 6 through line 38 and is forwarded to a place of use such as the central station of an air conditioning system. The medium, after passing through the central station, returns to the evaporator 4 through line 37 to be again cooled and reused.

Condensate leaves pan 10 of the condenser through line 40 and is returned to the evaporator and discharged therein over the tubes 6 to wet the tubes. It will be appreciated the refrigerant is flashed or vaporized by the heat exchange relation with medium passing through the tubes. Flashed vapor passes to the absorber to be absorbed by solution therein.

Pump 41 serves to recirculate liquid refrigerant collected in the exaporator about the evaporator. Pump 41 is connected to the evaporator by line 42 to withdraw liquid refrigerant therefrom. Pump 41 forwards the liquid refrigerant through line 43 to spray arrangement 44 of the evaporator, the liquid refrigerant flash-cooling upon discharge in the evaporator, remaining liquid refrigerant wetting the tubes to cool medium passing through the tubes. The heat exchange relation between medium passing through the tubes and the liquid refrigerant on the exterior of the tubes evaporates liquid refrigerant, the vapor passing to the absorber as previously described.

A suitable purge arrangement 45 is provided to remove non-condensible gases from the absorber. The ejector 46 of purge arrangement 45 is connected by line 47 to a purge line 48 extending longitudinally of the absorber. The cooling coil 49 of purge arrangement 45 is connected to line 37 by line 50 and to line 38 by line 51, permitting medium to be employed for cooling solution in the purge tank 52. Purge arrangement 45 is disclosed and claimed in application, Serial No. 565,324 filed February 14, 1956, now Patent No. 2,940,273, issued June 14, 1960, and reference is made to such application for a more complete description of the purging arrangement.

Considering the control arrangement of the present invention, a first tube 70 extends from the outlet compartment 62, over weir 60 and through compartment 61 to a point adjacent the discharge member 65. A second tube 71 is attached to tube 70 and extends from a point in compartment 61 adjacent weir 60 to a point adjacent discharge member 65. The ends of tubes 70, 71 adjacent discharge member 65 are connected to a box-like member 72 separated into compartments 72a and 72b which empty into tubes 70, 71 respectively, as hereinafter explained.

As stated above, tube 71 is attached to tube 70. Tube 70 is pivotally mounted in a support member 73 extending across compartment 62 so that it is rotatable in a horizontal plane; since tube 71 is attached to tube 70 it is rotatable therewith. A brace 74 is placed beneath tubes 70, 71 to provide additional support therefor.

A bar member 75 is attached to tube 70 at point 76, the other end of bar 75 having a rack 76' attached thereto. The bar 75 passes through shell 7, the opening therein being sealed by bellows 77'. A reversible motor 77 is placed exteriorly of shell 7, its shaft 78 carrying a spur gear 79 adapted to engage rack 76'. While I have described the actuating mechanism as attached to tubes 70, 71, it will be understood if desired discharge member 65 may be pivotably mounted and the actuating mechanism attached thereto.

Motor 77 is actuated by means of an electronic control 80 which includes an amplifier (not shown) and a relay (not shown) designed to change a temperature indication sensed by thermostat 81 placed in chilled water line 38 into an electrical signal to actuate motor 77. In response to the temperature of chilled water leaving the evaporator sensed by thermostat 81, motor 77 is actuated to shift the position of tubes 70, 71, and box 72 thus selecting the places of discharge of solution in the generator. That is, at full load, discharge member 65 discharges weak solution at one end of the generator, the solution flowing longitudinally through the generator in heat exchange relation with heating medium in tubes 8. However, as load decreases, the position of box 72 is shifted to catch some portion of the discharged solution, such solution passing through tube 71 and being discharged in compartment 61 adjacent to weir 60. As the load continues to decrease, the position of box 72 continues to shift until at zero load all solution is caught in compartment 72a and flows through tube 70 to outlet compartment 62, completely bypassing the heating medium in tubes 8.

While I have described the control arrangement as electronic, it will be appreciated that any suitable electrical or pneumatic controls may be provided since the specific construction of the controls is not a part of the present invention, suitable controls being readily available on the open market.

It will be understood that under full load conditions, all weak solution passes through line 15 and pipe 64 to discharge member 65 and is discharged in the generator adjacent one end thereof. However, as the load imposed on the system decreases, as reflected by the temperature of chilled water leaving the evaporator, the position of tubes 70, 71 is shifted to divert a portion of the discharged solution thus reducing the quantity of solution passing through the length of the generator in heat exchange relation with heating medium in tubes 8. So diverting weak solution varies the concentration of solution supplied to the absorber in accordance with cooled medium requirements. Generally, speaking, while the quantity of solution forwarded to the generator for reconcentration is substantially constant, such solution is in effect bypassed about tubes 8 as required to keep the absorber solution at the desired concentration to meet load requirements.

Considering the operation of the absorption refrigeration system, it will be appreciated that the machine is designed to operate at a desired steam pressure, for example, twelve pounds, because most existing steam boilers are designed to provide steam at such pressure. It will be appreciated other pressures may, of course, be used and in such case a pressure regulating valve may be placed in the steam line to assure that steam at the desired pressure is provided to the generator. I have described too a bypass about the tubes of the condenser for condensing water. It will be appreciated that in many cases such bypass is not necessary, but that it is desirable in order to adjust the machine to operation at full load conditions. After the machine is adjusted to operation at full load conditions, the condenser bypass need not be actuated for further operation. If desired, of course, for this purpose, steam pressure may be varied.

Considering operation of the absorption refrigeration system, it will be appreciated that at start-up the generator contains a large amount of precipitated or crystallized lithium bromide salt. In some cases, it appears as if at least the upper layers of the generator tubes were covered with a pile of white snow. It will be appreciated there is no need for manual or automatic steam valves to be closed during the shutdown period since the low thermal conductivity of the solid salt serves as an excellent insulator to shield the generator from the hot steam in the tubes. The solution in the remainder of the system including the heat exchanger is under extremely dilute conditions.

When the system is placed in operation, medium to be cooled is forwarded through line 37 to the tubes 6 of evaporator 4 and leaves the tubes 6 of evaporator 4 through line 38. At start-up, the pumps are actuated, pump 11 withdrawing weak solution from the absorber through line 12 and forwarding the weak solution through line 13, heat exchanger 14 and line 15 to generator 8, being discharged therein through discharge member 65 at one end of the generator and flowing through the length of the generator in heat exchange relation with heating medium in the tubes 8, overflowing weir 60 into compartment 62 and leaving the generator through outlet 66.

In the generator, the solution flows over the salt encrusted about tubes 8 gradually dissolving the solid salt and returning the concentrated solution to the absorber where it can immediately go to work to produce useful refrigeration. It will be appreciated that instead of needing to wait for the overall solution concentration in the machine to build up, the latent capacity of the stored solid salt in the generator is instantly ready to go to work. This is virtually impossible with any other type of control arrangement.

Refrigerant vapor is boiled from the solution in the generator 8, vapor passing to condenser 9 and being condensed therein, the condensate returning to the evaporator through line 40.

Strong solution leaves the generator through outlet 66, line 17, heat exchanger 14, line 18 and is discharged, preferably, over an end of the absorber tube bundle. Strong solution is flash-cooled to some slight extent as it is discharged in the absorber. The discharged strong solution mixes with solution in the absorber and is withdrawn from the absorber through outlet 21 and line 22 by pump 20, solution of intermediate concentration so formed being returned to the absorber through line 23 and being sprayed over the tube bundle by spray arrangement 24. It will be appreciated that the mixture of strong solution and solution in the absorber forming the solution of intermediate concentration is further mixed and cooled in passage through the refrigeration system.

Pump 41 serves to withdraw liquid refrigerant from the pan 5 of evaporator 4, and to recirculate the liquid refrigerant through lines 42 and 43 to the discharge means 44 of the evaporator. The discharge means 44 sprays the liquid refrigerant over the tubes 6 of evaporator 4. The tubes are wetted by the liquid refrigerant, the wetted refrigerant being vaporized by the heat exchange relation with medium passing through the tubes. Vapor so formed passes outwardly through the eliminators and flows downward to the absorber 3 being absorbed by solution therein.

Vapor condensate is returned from condenser 9 through line 40 to the evaporator being flash-cooled upon discharge therein over tube 6. Thus, the vapor condensate aids in wetting the tubes to cool the medium passing therethrough.

Now, considering operation at full load conditions, the cooled medium rapidly cools down to design conditions and all solution supplied to the generator is discharged at one end thereof to permit the full volume of weak solution to pass through the generator in heat exchange relation with heating medium thereby dissolving the solid salt encrusted on the tubes and assuring that all salt is present in the system in solution. Assuming the system goes on operation at partial load as indicated by a decrease in the temperature of cooled medium leaving the evaporator reflected by thermostat 81, control 80 actuates motor 77 to rotate tubes 70, 71, thereby shifting the position of the tubes and box 72 beneath discharge member 65 permitting some solution to flow through tube 71 to be discharged in compartment 61 adjacent weir 60 so that it is not in heat exchange relation with heating medium for any substantial period of time. As the weak solution flow to the generator is bypassed or diverted by greater quantities being permitted to flow through tubes 70, 71, the solution concentration in the generator adjacent tubes 8 gradually changes, at approximately 50% load approaching the consistency of thick syrup. At approximately 25% load, it appears to be a thick slush. Even though the solution in the generator adjacent tubes 8 begins to increase in concentration as soon as the system begins to operate on partial load, the solution leaving the generator is diluted to more than a safe concentration before it reaches the heat exchanger by the addition of weak solution thereto which bypasses tubes 8 thus preventing precipitation or crystallization in the heat exchanger. At zero load, substantially all solution supplied to the generator flows through tube 70 to the outlet compartment so that the solution bypasses tubes 8 permitting salt to precipitate thereon for weir 60 prevents solution in compartment 61 overflowing to outlet compartment 62 with the result that refrigerant in solution is boiled off so that precipitated salt collects adjacent tubes 8. In one sense, the present arrangement may be considered as the circulation of solution at zero load with the addition of solid salt or slush thereto as required to provide a solution of higher concentration as the load imposed upon the system increases, that is, to maintain a desired concentration in accordance with the load imposed on the system.

It will be appreciated that precipitation of salt in the generator does not interfere with system operation; even though lumps of solid salt may be carried from the generator they are immediately dissolved and diluted by the weak solution before they reach the heat exchanger.

The present absorption refrigeration system and its control arrangement permit a vast decrease in consumption of steam at partial load operations. Condensing temperatures in the condenser during partial load operations are the lowest possible temperatures which can be obtained, thus greatly reducing tendencies to scaling of the condenser tubes. Under any circumstances, partial load operation of the system even down to zero percent may be assured. Use of the present control arrangement obviates cycling of the system even at low load conditions.

An advantage of the control arrangement of the present absorption refrigeration system resides in its provision as an integral part of the system requiring no field application engineering, installation or the like. The control arrangement may be factory engineered, factory installed, and factory tested.

In the present system, twelve pounds of steam pressure, or less, is employed for all load conditions so that engineering time need not be used in field installations in developing varying steam conditions under partial load operations. Since steam pressures remain constant under all load conditions, corrosion problems due to introduction of air into the steam condensate system under partial load conditions do not arise. Such problems may arise with steam controls with which, as load imposed on the system reduces, operation exists at sub-atmospheric steam conditions permitting air to enter the steam system. No need exists for automatic or manual steam valves during normal operation.

While at first glance it may appear that serious problems might exist in employing the present control arrangement since experts in the field heretofore have always deemed crystallization or solidification of solution in the system dangerous under any circumstances, the present invention makes use of solidification of salt in the generator to provide cheaper and more efficient control of operation during conditions of partial load operation. In effect, the present control arrangement takes what was heretofore thought a major disadvantage in absorption refrigeration systems employing a saline solution as an absorbent and employs this so-called disadvantage to render control of this system more effective, cheaper and to prevent scaling of condenser tubes. Storage problems are minimized since the solution is diluted by removing solid salt and not by diluting the entire charge. The control arrangement is economical in manufacture and highly satisfactory in operation permitting accurate control throughout the full range of load conditions.

While I have described a preferred embodiment of the invention, it will be appreciated the invention is not so limited since it may be otherwise embodied within the scope of the following claims.

I claim:

1. In combination with an absorption refrigeration system including a generator having a weir member therein separating the generator in a first compartment and a second compartment, a tube bundle placed in the first compartment, and an outlet for strong solution placed in the second compartment, means for discharging weak solution in the generator in heat exchange relation with heating medium passing through the tube bundle therein, said discharge means including a pipe member having an open end extending within the generator, and a control arrangement for varying the quantity of weak solution discharged in the generator in heat exchange relation with the heating medium, said arrangement including a first tube member extending from the second compartment through the first compartment adjacent the discharge means adapted to receive solution from the discharge means, a second tube member extending from a portion of the first compartment adjacent the second compartment to a point adjacent the discharge means adapted to receive solution from the discharge means, a box-like member adapted to be placed below the open end of the pipe member and connected to the first and second tube members, said box-like member being separated into two sections each of which is connected to one of the tube members, and means for varying the relationship between said discharge means and said tube members to select the places of discharge of said solution in the generator thereby varying the quantity of solution discharged in the generator in heat exchange relation with heating medium therein.

2. The combination according to claim 1 in which the tube members are rotatably mounted in a substantially horizontal plane to permit movement of the box-like member beneath the open end of the pipe member.

3. The combination according to claim 2 in which the means for varying the relationship between the open end of the pipe member and the box-like member include a bar member connected to the tube members, a rack on said bar member, a reversible motor, a spur gear on the motor shaft engaging the rack, and means to actuate the motor responsive to the load imposed upon the system.

4. The combination according to claim 3 in which the motor actuating means is responsive to the temperature of chilled water leaving the evaporator of the system.

References Cited in the file of this patent

UNITED STATES PATENTS

| | | |
|---|---|---|
| Re. 22,043 | Nelson | Mar. 3, 1942 |
| 2,129,502 | McCreary | Sept. 6, 1938 |
| 2,679,733 | Ashley | June 1, 1954 |
| 2,715,610 | Thompson | Aug. 16, 1955 |